United States Patent
Freeman et al.

(10) Patent No.: US 10,143,327 B2
(45) Date of Patent: Dec. 4, 2018

(54) COOKTOP STEAMER WITH SELF-FILLING CUP

(71) Applicants: BSH Home Appliances Corporation, Irvine, CA (US); BSH Hausgeräte GmbH, Munich (DE)

(72) Inventors: John Freeman, Knoxville, TN (US); Charlie Hanna, Knoxville, TN (US); Jeremiah Nash, Powell, TN (US); Dennis Staley, Evansville, IN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 92 days.

(21) Appl. No.: 14/803,144

(22) Filed: Jul. 20, 2015

(65) Prior Publication Data
US 2017/0020323 A1   Jan. 26, 2017

(51) Int. Cl.
*A47J 27/04* (2006.01)
*A47J 27/16* (2006.01)
*A23L 1/01* (2006.01)

(52) U.S. Cl.
CPC .............. *A47J 27/04* (2013.01); *A23L 1/0121* (2013.01); *A47J 27/16* (2013.01); *A47J 2027/043* (2013.01)

(58) Field of Classification Search
CPC ....... A47J 27/04; A47J 27/16; A47J 2027/043
USPC .......... 99/331, 337, 349, 417; 426/231, 510
See application file for complete search history.

(56) References Cited

U.S. PATENT DOCUMENTS

| | | | | |
|---|---|---|---|---|
| 2,847,547 | A * | 8/1958 | Gordon, Jr. | .......... A61M 11/041 392/406 |
| 4,655,192 | A * | 4/1987 | Jovanovic | ................ A21B 3/04 126/20 |
| 6,267,046 | B1 * | 7/2001 | Wanat | ..................... A47J 27/05 99/332 |
| 2013/0126514 | A1 | 5/2013 | Cheung et al. | |
| 2015/0366394 | A1 | 12/2015 | Pan | |

FOREIGN PATENT DOCUMENTS

EP    1955622 B1    9/2011

OTHER PUBLICATIONS

International Search Report PCT/IB2016/053961 dated Sep. 28, 2016.

* cited by examiner

*Primary Examiner* — Thien S Tran
(74) *Attorney, Agent, or Firm* — Michael E. Tschupp; Andre Pallapies; Brandon G. Braun

(57) ABSTRACT

A domestic steaming appliance for steaming food items is provided. The domestic steamer appliance includes a base; a steamer insert mounted in the base; a steamer cup located below the steamer insert; a removable water tank configured to hold water for feeding to the steamer cup, the water tank having a top that forms an air tight seal with the water tank when the top is in place on the water tank; and a feeder tube fluidly connecting the water tank to the steamer cup, the feeder tube being connected to the steamer cup at a steamer cup inlet. The water in the water tank is fed to the steamer cup by way of the feeder tube under gravitational force only.

29 Claims, 4 Drawing Sheets

COOKTOP STEAMER WITH SELF-FILLING CUP

FIELD OF THE INVENTION

The invention is directed to an apparatus and method related to filling a steamer cup in a cooktop steamer.

An example of an application for the invention is a steamer mounted in a range top in a domestic kitchen.

BACKGROUND OF THE INVENTION

Some modern domestic kitchens include an appliance for preparing food by steaming.

In some domestic appliances, steam is created for cooking in a range top steamer. By using a cup assembly with a heating element incorporated, steam is generated in a matter of seconds. Water is supplied to the steam cup area from a separate water tank. Some cooktop steamers have a steam cup assembly, including a heater element and temperature limiting resistors, that is located at the bottom of a steamer cavity. An electronically controlled valve with appropriate sensors is used to control the amount of water fed to the steam cup. The problem with this type of appliance is that the electronically controlled valve can be expensive and complicated, leading to potential failures and costly repairs.

Applicants recognized this problem and developed a solution as described herein.

SUMMARY

The invention achieves the benefit of not requiring an electronically controlled valve and the associated electronics and sensors. The invention achieves this benefit by providing a removable water tank, an automatic mechanical valve, and a particular configuration of water feeder tube and steamer cup inlet.

Particular embodiments of the invention are directed to a domestic steaming appliance for steaming food items. The domestic steamer appliance includes a base; a steamer insert mounted in the base; a steamer cup located below the steamer insert; a removable water tank configured to hold water for feeding to the steamer cup, the water tank having a top that forms an air tight seal with the water tank when the top is in place on the water tank; and a feeder tube fluidly connecting the water tank to the steamer cup, the feeder tube being connected to the steamer cup at a steamer cup inlet. The water in the water tank is fed to the steamer cup by way of the feeder tube under gravitational force only.

Other embodiments of the invention are directed to a method of filling a steamer cup in a domestic steaming appliance for steaming food items, the domestic steamer appliance having a base, a steamer insert mounted in the base, a steamer cup located below the steamer insert, a removable water tank configured to hold water for feeding to the steamer cup, the water tank having a top that forms an air tight seal with the water tank when the top is in place on the water tank, and a feeder tube fluidly connecting the water tank to the steamer cup, the feeder tube being connected to the steamer cup at a steamer cup inlet. The method includes removing the water tank from the domestic steamer appliance; adding water to the water tank; placing the water tank with water in the base, the placement of the water tank in the base causing water to flow from the water tank to the steamer cup; and limiting an amount of the water that enters the steamer cup by preventing air from flowing from the steamer cup to the water tank through the feeder tube when the water in the steamer cup covers the steamer cup inlet. The water in the water tank is fed to the steamer cup by way of the feeder tube under gravitational force only.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide a solution to the problems associated with use of an electronically controlled valve and the associated electronic controls and sensors to control the amount of water fed to the steam cup. Embodiments of the invention use a gravity fed system for supplying the proper amount of water to the steamer cup to produce steam for cooking the food. As water is used in the production of steam, and the water level in the steamer cup drops past a certain point, water is automatically fed from the water tank to the steamer cup.

Figure 1:
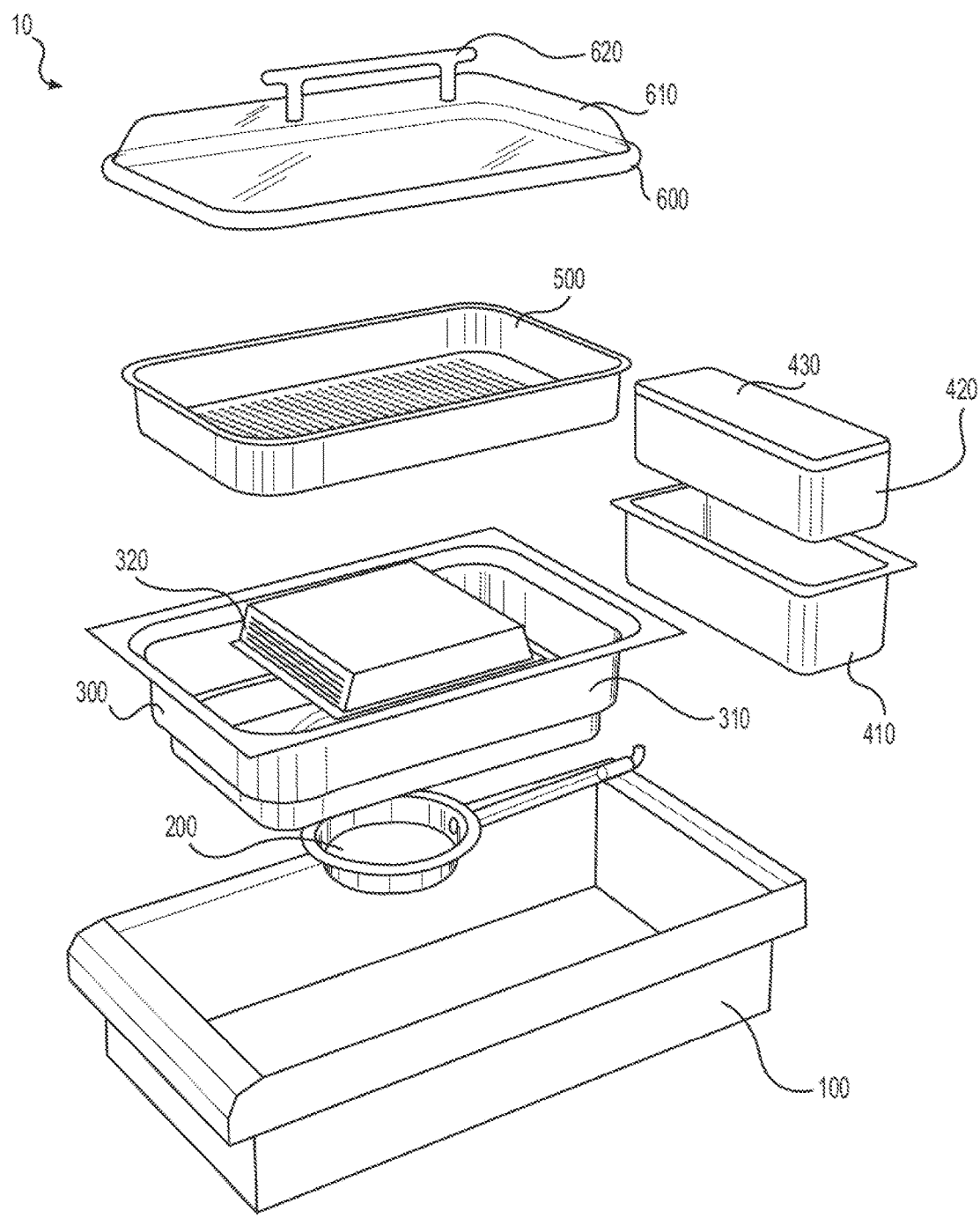
FIG. 1 is an exploded view of an exemplary embodiment of the invention.

FIG. 1 shows an exploded view of an example of embodiments of the invention. The example shown in FIG. 1 is a cooktop steamer 10 that can be mounted in a countertop or a range, for example. Steamer 10 has a base 100 that is configured to be recessed, for example, in a mounting surface such as, for example, a countertop or a range. A steamer body 300 sits in base 100 and includes a container 310 and a baffle 320. Container 310 forms the bottom and sides of the steaming area. Container 310 can be made of a metal such as, for example, stainless steel or aluminum, or of another heat resistant material.

Baffle 320 may have perforations around its perimeter to allow steam produced in a steamer cup assembly 200 (describe below in more detail) to be distributed within container 310 and/or to prevent food from falling into steamer cup 210. In this example, the upper portion of baffle 320 is shown a solid, with no perforations, however other examples may include perforations in the upper portion of baffle 320. Like container 310, baffle 320 can be made of a metal such as, for example, stainless steel or aluminum, or of another heat resistant material.

A lid 600 having a cover portion 610 and a handle 620 forms the top of the steaming area. Although cover portion 610 is shown as transparent glass in this example, other materials can be used.

A steamer insert 500 is configured to sit within container 310 and below lid 600 during the steaming process. Food items to be steamed can be placed in steamer insert 500. As shown more clearly in FIG. 2, steamer insert 500 has perforations 510 in its lower surface to allow steam produced in steamer cup assembly 200 to rise and contact the food items to be steamed. In some embodiments, the sides of steamer insert 500 also include perforations. In this example, steamer insert 500 has a lip at its upper edge that sits in a recess in container 310 so that the bottom of steamer insert 500 is held above baffle 320 in order to facilitate a more uniform distribution of steam rising up through perforations 510. Some embodiments include a handle, either removable or attached, on steamer insert 500 to facilitate the removal of steamer insert 500 from container 310.

Base 100 is configured to receive, or includes, a tank receiving portion 410 that receives a removable water tank 420. Removable water tank 420 holds water that is supplied to steamer cup assembly 200 for the production of steam by steamer cup assembly 200. Steamer cup assembly 200 includes a heat source that heats steamer cup 210 to produce the steam. Water tank 420 has a removable top 430 that forms an airtight seal with water tank 420 when removable top 430 is in place on water tank 420. Water tank 420 and top 430 are removable as a unit from tank receiving portion 410.

Figure 2:
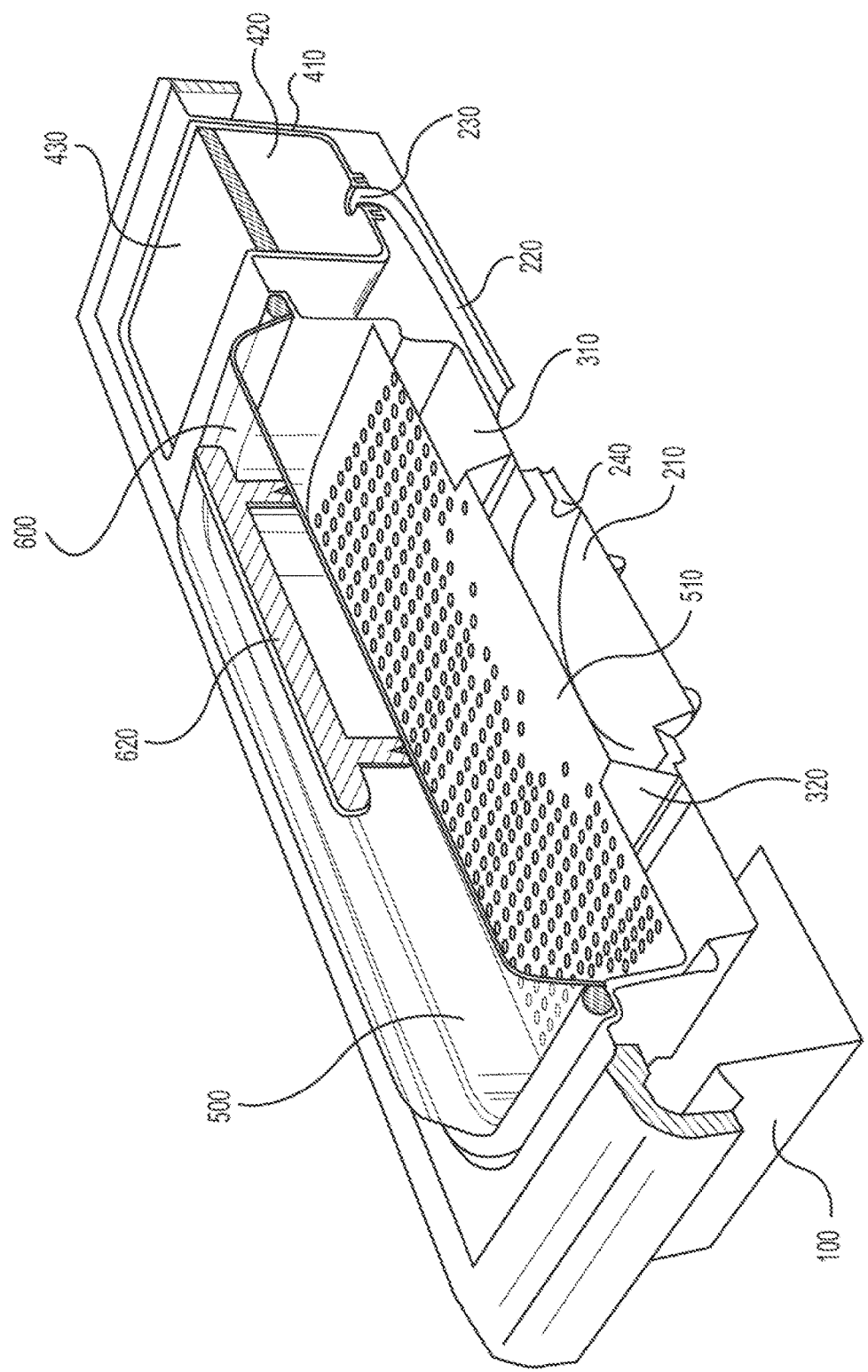
FIG. 2 is a partial sectional view of an exemplary embodiment of the invention.
Figure 3:
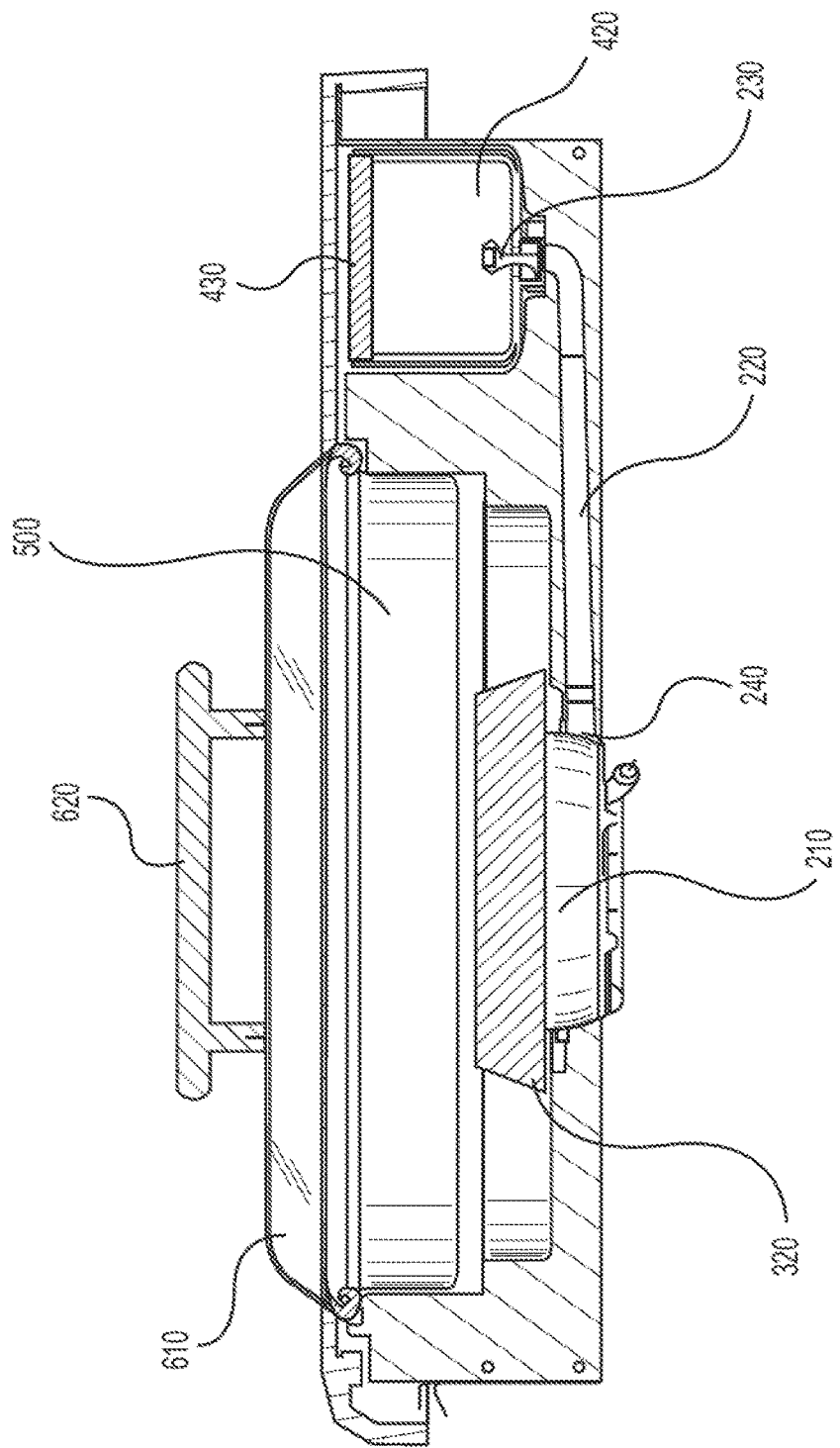
FIG. 3 is a partial sectional view of an exemplary embodiment of the invention.

As shown more clearly in FIGS. 2 and 3, in this example, water tank 420 includes a valve 230 in its bottom surface. When water tank 420 is in the operating position, as shown in FIGS. 2 and 3, a lower end of valve 230 contacts feeder tube 220 and is pushed up by feeder tube 220. This opens valve 230 and allows water to flow from water tank 420 through feeder tube 220 and into steamer cup 210. When water tank 420 is removed from tank receiving portion 410, valve 230 is allowed to move into a closed position as the bottom of valve 230 is moved away from feeder tube 220. Valve 230 can include a spring that urges valve 230 downward into the closed position. While a spring is used in this example, other urging devices can be used to move valve 230 from the open position to the closed position.

Because water tank 420 forms an airtight seal with top 430, the only inlet/outlet for air and/or water is valve 230. As a result, for water to drain from water tank 420 into feeder tube 220 and, ultimately, steamer cup 210, air must travel from steamer cup 210 through feeder tube 220 and into water tank 420.

As shown in FIGS. 2 and 3, a steamer cup inlet 240 exists at the interface between feeder tube 220 and steamer cup 210. As shown in FIG. 3, feeder tube 220 is angled downward from valve 230 to steamer cup inlet 240. This configuration permits air to travel into steamer cup inlet 240 and through feeder tube 220 into water tank 420 until the water level in steamer cup 210 is above the top of steamer cup inlet 240. When the water level in steamer cup 210 is above the top of steamer cup inlet 240, no further air can pass through steamer cup inlet 240 and into water tank 420. This creates a low-pressure situation in water tank 420 which prevents any further water from leaving water tank 420. As water is boiled in steamer cup 210 and, as a result, the water level in steamer cup 210 drops, the top of steamer cup inlet 240 is eventually exposed to air, allowing air to travel into steamer cup inlet 240, through feeder tube 220 and into water tank 420. This passage of air relieves the low-pressure situation in water tank 420 and allows water to again flow from water tank 420 into steamer cup 210. This cycle is repeated as water is boiled off during the production of steam.

Some cooktop steamers use an external heating element to heat a much larger cavity (similar to the invention's container 310) that contains water to produce steam. This type of arrangement requires larger heat source, or a much longer time to generate steam. By heating a smaller amount of water in steamer cup 210, the invention produces steam more quickly with a smaller heat source.

The above described embodiments of the invention allow this smaller amount of water to be gravity fed to steamer cup 210 without the use of an electronically controlled valve and, at the same time, preventing overfilling of steamer cup 210. The configuration of steamer cup inlet 240 and feeder tube 220 in conjunction with the airtight nature of water tank 420 results in a system that automatically refills steamer cup 210 as needed. Because valve 230 is moved to the open position when water tank 420 is positioned in the operating position, in this example water tank 420 is removable so that water can be introduced to water tank 420 while valve 230 is in the closed position. Then, when water tank 420 is placed in the operating position and valve 230 is moved to the open position, because lid 430 of water tank 420 is airtight, only the desired amount of water can flow from water tank 422 steamer cup 210.

Figure 4:
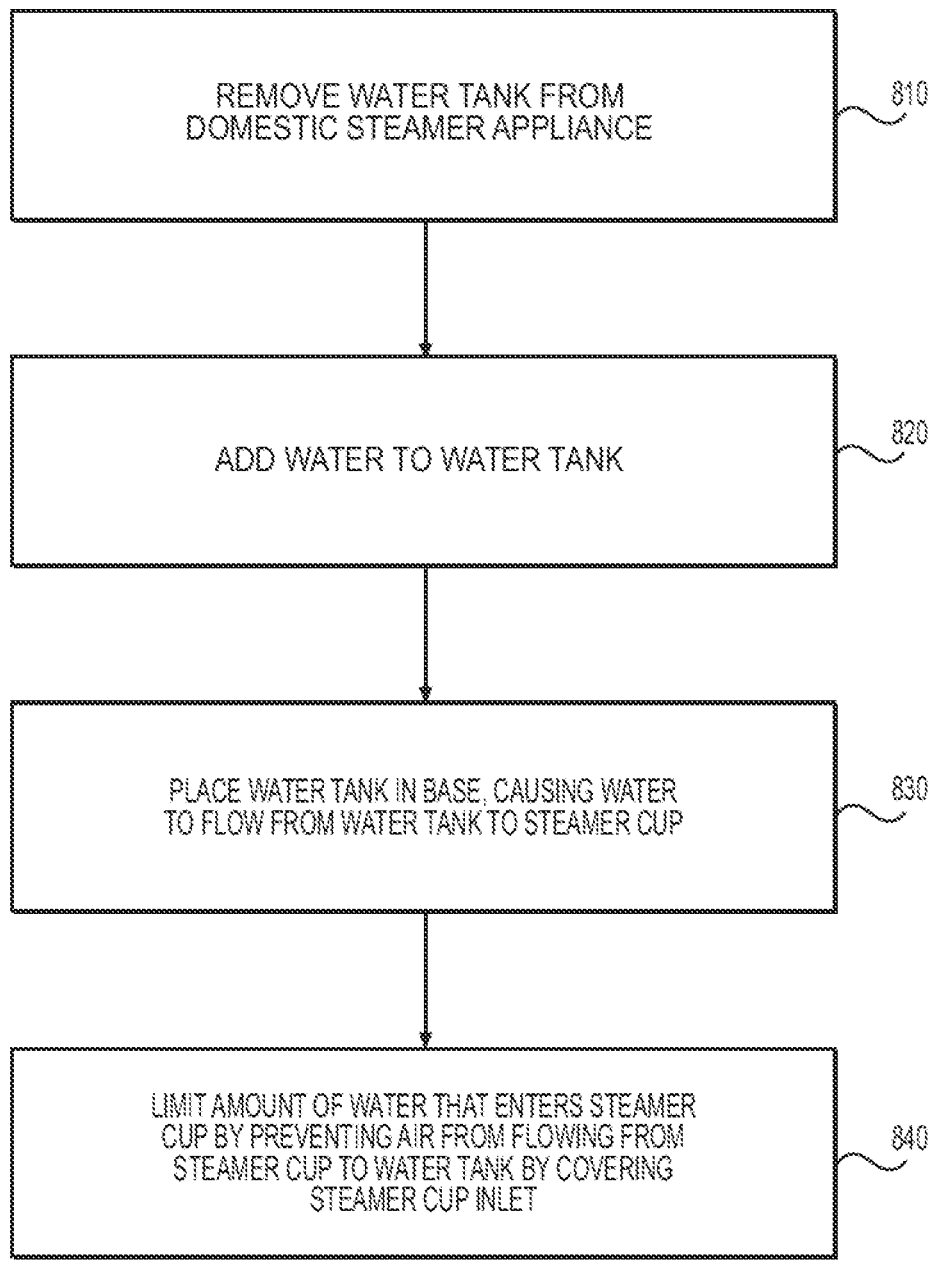
FIG. 4 is an example of a method in accordance with embodiments of the invention.

FIG. 4 shows an example of a method in accordance with embodiments of the invention. At 810, a user removes the water tank from the steamer appliance. At 820, the user adds water to the water tank and secures the airtight top on the water tank. At 830, the user places the water tank in the base, which activates the valve and allows water to flow from the water tank through the feeder tube and into the steamer cup. At 840, the amount of water that enters the steamer cup is limited by air being prevented from flowing from the steamer cup to the water tank as a result of the water level in the steamer cup covering the steamer cup inlet.

As can be seen in the above exemplary embodiments, the invention provides a solution to the problems associated with use of an electronically controlled valve and the associated electronic controls and sensors to control the amount of water fed to the steam cup.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the invention.

What is claimed is:

1. A domestic steaming appliance for steaming food items, the domestic steamer appliance comprising:
   a base;
   a steamer insert mounted in the base;
   a steamer cup located below the steamer insert;
   a removable water tank configured to hold water for feeding to the steamer cup, the water tank having a top that forms an air tight seal with the water tank when the top is in place on the water tank;
   a feeder tube fluidly connecting the water tank to the steamer cup, the feeder tube being connected to the steamer cup at a steamer cup inlet,
   wherein the water in the water tank is fed to the steamer cup by way of the feeder tube under gravitational force only,
   wherein the feeder tube is the only fluid connection between the water tank and the steamer cup when the top is in place on the water tank; and
   a valve in the water tank, the valve fluidly connecting the water tank to the feeder tube, wherein the steamer cup inlet has a vertically highest point and the highest vertical point of the steamer cup inlet is below the valve when the water tank is in the operating position, and the steamer cup inlet has a vertically lowest point that is above a floor surface of the steamer cup such that air is permitted to travel from the steamer cup to the water tank when a water level of the water in the steamer cup is below the vertically highest point to thereby permit a flow of the water from the water tank to the steamer cup and maintain a proper amount of water in the steamer cup to produce steam for steaming the food items.

2. A domestic steaming appliance for steaming food items, the domestic steamer appliance comprising:
   a base;
   a steamer insert mounted in the base;
   a steamer cup located below the steamer insert;
   a removable water tank configured to hold water for feeding to the steamer cup, the water tank having a top that forms an air tight seal with the water tank when the top is in place on the water tank; and
   a feeder tube fluidly connecting the water tank to the steamer cup, the feeder tube being connected to the steamer cup at a steamer cup inlet,
   wherein the water in the water tank is fed to the steamer cup by way of the feeder tube under gravitational force only,
   wherein the feeder tube is the only fluid connection between the water tank and the steamer cup when the top is in place on the water tank,
   wherein when water in the steamer cup covers the steamer cup inlet, air is prevented from traveling from the steamer cup to the water tank by the water covering the steamer cup inlet, and
   wherein the steamer cup inlet has a vertically lowest point that is above a floor surface of the steamer cup such that air is permitted to travel from the steamer cup to the water tank when a water level of the water in the steamer cup is below the vertically highest point to thereby permit a flow of the water from the water tank to the steamer cup and maintain a proper amount of water in the steamer cup to produce steam for steaming the food items.

3. A method of filling a steamer cup in a domestic steaming appliance for steaming food items, the domestic steamer appliance comprising a base, a steamer insert mounted in the base, a steamer cup located below the steamer insert, a removable water tank configured to hold water for feeding to the steamer cup, the water tank having a top that forms an air tight seal with the water tank when the top is in place on the water tank, and a feeder tube fluidly connecting the water tank to the steamer cup, the feeder tube being connected to the steamer cup at a steamer cup inlet, wherein the water in the water tank is fed to the steamer cup by way of the feeder tube under gravitational force only, and wherein the feeder tube is connected to a side of the steamer cup at the steamer cup inlet, the method comprising:
   removing the water tank from the domestic steamer appliance;
   adding water to the water tank;
   placing the water tank with water in the base, the placement of the water tank in the base causing water to flow from the water tank to the steamer cup; and
   limiting an amount of the water that enters the steamer cup by preventing air from flowing from the steamer cup to the water tank through the feeder tube when the water in the steamer cup covers the steamer cup inlet,
   wherein the water in the water tank is fed to the steamer cup by way of the feeder tube under gravitational force only.

4. The method of claim 3, wherein, when the top is in place on the water tank, the water can flow to the steamer cup from the water tank only through the feeder tube and air can flow from the steamer cup to the water tank only through the feeder tube.

5. The method of claim 4, further comprising
   controlling a flow of water from the water tank with a valve;
   holding the valve in a closed position when the water tank is removed from the domestic steamer appliance; and
   holding the valve in an open position when the water tank is in an operating position in the domestic steamer appliance.

6. A domestic steaming appliance for steaming food items, the domestic steamer appliance comprising:
   a base;
   a steamer insert mounted in the base;
   a steamer cup located below the steamer insert;
   a removable water tank configured to hold water for feeding to the steamer cup, the water tank having a top that forms an air tight seal with the water tank when the top is in place on the water tank; and
   a feeder tube fluidly connecting the water tank to the steamer cup, the feeder tube being connected to the steamer cup at a steamer cup inlet,
   wherein the water in the water tank is fed to the steamer cup by way of the feeder tube under gravitational force only, and
   wherein the steamer cup is removable from the base.

7. A domestic steaming appliance for steaming food items, the domestic steamer appliance comprising:
   a base;
   a steamer insert mounted in the base;
   a steamer cup located below the steamer insert;
   a removable water tank configured to hold water for feeding to the steamer cup, the water tank having a top that forms an air tight seal with the water tank when the top is in place on the water tank; and
   a feeder tube fluidly connecting the water tank to the steamer cup, the feeder tube being connected to the steamer cup at a steamer cup inlet,
   wherein the water in the water tank is fed to the steamer cup by way of the feeder tube under gravitational force only, and
   wherein the steamer cup and the feeder tube form a removable steamer cup assembly that is removable from the base.

8. A domestic steaming appliance for steaming food items, the domestic steamer appliance comprising:
   a base;
   a steamer insert mounted in the base;
   a steamer cup located below the steamer insert;
   a removable water tank configured to hold water for feeding to the steamer cup, the water tank having a top that forms an air tight seal with the water tank when the top is in place on the water tank; and
   a feeder tube fluidly connecting the water tank to the steamer cup, the feeder tube being connected to the steamer cup at a steamer cup inlet,
   wherein the water in the water tank is fed to the steamer cup by way of the feeder tube under gravitational force only, and
   wherein the feeder tube is connected to a side of the steamer cup at the steamer cup inlet.

9. A domestic steaming appliance for steaming food items, the domestic steamer appliance comprising:
a base;
a steamer insert mounted in the base;
a steamer cup located below the steamer insert;
a removable water tank configured to hold water for feeding to the steamer cup, the water tank having a top that forms an air tight seal with the water tank when the top is in place on the water tank;
a feeder tube fluidly connecting the water tank to the steamer cup, the feeder tube being connected to the steamer cup at a steamer cup inlet,
wherein the water in the water tank is fed to the steamer cup by way of the feeder tube under gravitational force only,
wherein the feeder tube is the only fluid connection between the water tank and the steamer cup when the top is in place on the water tank; and
a valve in the water tank, the valve fluidly connecting the water tank to the feeder tube,
wherein the feeder tube is angled downward from the valve to the steamer cup inlet at a side of the steamer cup.

10. A domestic steaming appliance for steaming food items, the domestic steamer appliance comprising:
a base;
a steamer insert mounted in the base;
a steamer cup located below the steamer insert;
a removable water tank configured to hold water for feeding to the steamer cup, the water tank having a top that forms an air tight seal with the water tank when the top is in place on the water tank; and
a feeder tube fluidly connecting the water tank to the steamer cup, the feeder tube being connected to the steamer cup at a steamer cup inlet,
wherein the water in the water tank is fed to the steamer cup by way of the feeder tube under gravitational force only,
wherein the base is recessed in a mounting surface of one of a countertop and a cooking range.

11. A domestic steaming appliance for steaming food items, the domestic steamer appliance comprising:
a base;
a steamer insert mounted in the base;
a steamer cup located below the steamer insert;
a removable water tank configured to hold water for feeding to the steamer cup, the water tank having a top that forms an air tight seal with the water tank when the top is in place on the water tank;
a feeder tube fluidly connecting the water tank to the steamer cup, the feeder tube being connected to the steamer cup at a steamer cup inlet,
wherein the water in the water tank is fed to the steamer cup by way of the feeder tube under gravitational force only;
a steamer body between the steamer insert and the steamer cup; and
a baffle in the steamer body.

12. A domestic steaming appliance for steaming food items, the domestic steamer appliance comprising:
a base;
a steamer insert mounted in the base;
a steamer cup located below the steamer insert;
a removable water tank configured to hold water for feeding to the steamer cup, the water tank having a top that forms an air tight seal with the water tank when the top is in place on the water tank; and
a feeder tube fluidly connecting the water tank to the steamer cup, the feeder tube being connected to the steamer cup at a steamer cup inlet,
wherein the water in the water tank is fed to the steamer cup by way of the feeder tube under gravitational force only,
wherein the steamer cup inlet has a vertically highest point and a vertically lowest point, the vertically highest point being at a higher level than the vertically lowest point, and
wherein the feeder tube is connected to the steamer cup inlet such that air is permitted to travel from the steamer cup to the water tank via the feeder tube when a water level of the water in the steamer cup is below the vertically highest point of the steamer cup inlet to thereby permit a flow of the water from the water tank to the steamer cup and maintain a proper amount of water in the steamer cup to produce steam for steaming the food items.

13. The domestic steaming appliance of claim 12, wherein the vertically lowest point of the steamer cup inlet is at a higher level than a floor surface of the steamer cup.

14. The domestic steaming appliance of claim 8, wherein the feeder tube is connected to the steamer cup inlet at the side of the steamer cup such that air is permitted to travel from the steamer cup to the water tank via the feeder tube when a water level of the water in the steamer cup is below a vertically highest point of the steamer cup inlet to thereby permit a flow of the water from the water tank to the steamer cup and maintain an amount of water in the steamer cup to produce steam for steaming the food items.

15. The domestic steaming appliance of claim 8, wherein the feeder tube is the only fluid connection between the water tank and the steamer cup when the top is in place on the water tank.

16. The domestic steaming appliance of claim 15, further comprising a valve in the water tank, the valve fluidly connecting the water tank to the feeder tube.

17. The domestic steaming appliance of claim 16, wherein the valve is held in a closed position when the water tank is removed from the domestic steamer appliance, and the valve is held in an open position when the water tank is in an operating position in the domestic steamer appliance.

18. The domestic appliance of claim 17, wherein the valve is held in the open position by the valve coming into contact with an inlet end of the feeder tube.

19. The domestic steaming appliance of claim 18, wherein the valve is held in the closed position by a spring located in the water tank.

20. The domestic steaming appliance of claim 19, further comprising a removable steamer insert configured to support the food items to be steamed, the steamer insert being received in a recess in the base.

21. The domestic steaming appliance of claim 20, wherein when water in the steamer cup covers the steamer cup inlet, air is prevented from traveling from the steamer cup to the water tank by the water covering the steamer cup inlet.

22. The domestic steaming appliance of claim 19, wherein the steamer cup inlet has a vertically highest point and the highest vertical point of the steamer cup inlet is below the valve when the water tank is in the operating position.

23. The domestic steaming appliance of claim 17, wherein the valve is held in a closed position when the water tank is removed from the domestic steamer appliance, and the valve is held in an open position when the water tank is in an operating position in the domestic steamer appliance.

24. The domestic steaming appliance of claim 8, further comprising a valve in the water tank, the valve fluidly connecting the water tank to the feeder tube.

25. The domestic steaming appliance of claim 18, wherein when water in the steamer cup covers the steamer cup inlet, air is prevented from traveling from the steamer cup to the water tank by the water covering the steamer cup inlet.

26. The domestic steaming appliance of claim 17, wherein when water in the steamer cup covers the steamer cup inlet, air is prevented from traveling from the steamer cup to the water tank by the water covering the steamer cup inlet.

27. The domestic steaming appliance of claim 16, wherein when water in the steamer cup covers the steamer cup inlet, air is prevented from traveling from the steamer cup to the water tank by the water covering the steamer cup inlet.

28. The domestic steaming appliance of claim 8, wherein when water in the steamer cup covers the steamer cup inlet, air is prevented from traveling from the steamer cup to the water tank by the water covering the steamer cup inlet.

29. The domestic steaming appliance of claim 8, wherein the steamer cup and the removable water tank are configured to control an amount of water that enters the steamer cup from the removable water tank and maintain a proper amount of water in the steamer cup to produce steam for steaming the food items by limiting a flow of the water from the water tank to the steamer cup when the amount of the water in the steamer cup covers the steamer cup inlet of the steamer cup thereby preventing air from flowing from the steamer cup to the water tank through the feeder tube, and permitting the flow of the water from the water tank to the steamer cup when the amount of the water in the steamer cup is below the steamer cup inlet of the steamer cup thereby permitting the air to flow from the steamer cup to the water tank through the feeder tube.

* * * * *